United States Patent
Chang et al.

(10) Patent No.: US 10,807,650 B2
(45) Date of Patent: Oct. 20, 2020

(54) HOOD LATCH SUPPORT BEAM

(71) Applicant: Ford Global Technologies, LLC, Dearborn, MI (US)

(72) Inventors: Jungmao Michael Chang, Novi, MI (US); Marwan Ahmad Elbkaily, Canton, MI (US); Michael Jon Gutowski, Saline, MI (US); Samar Majbour, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 548 days.

(21) Appl. No.: 15/730,130

(22) Filed: Oct. 11, 2017

(65) Prior Publication Data

US 2019/0106158 A1 Apr. 11, 2019

(51) Int. Cl.
*B62D 25/12* (2006.01)
*E05B 83/24* (2014.01)

(52) U.S. Cl.
CPC .............. *B62D 25/12* (2013.01); *E05B 83/24* (2013.01)

(58) Field of Classification Search
CPC ........ B62D 25/12; B62D 25/08; B62D 2/085; B62D 29/00; E05B 83/24
USPC .............. 296/193.09, 203.01, 203.02, 187.1, 296/187.09, 193.11; 180/68.4, 69, 2, 180/69.21
See application file for complete search history.

(56) References Cited

U.S. PATENT DOCUMENTS

| | | | |
|---|---|---|---|
| 7,114,587 B2 * | 10/2006 | Mori ...................... | B60K 11/04 180/68.3 |
| 7,597,384 B2 | 10/2009 | Wallman et al. | |
| 8,167,361 B2 | 5/2012 | Riviere et al. | |
| 8,807,634 B2 | 8/2014 | Horimizu | |
| 9,033,092 B1 | 5/2015 | Rao et al. | |
| 9,162,714 B2 | 10/2015 | Maier et al. | |
| 2002/0084122 A1 * | 7/2002 | Emori ................... | B62D 29/001 180/68.4 |
| 2013/0334842 A1 * | 12/2013 | Iseki .................. | B62D 25/2018 296/203.02 |

FOREIGN PATENT DOCUMENTS

| | | |
|---|---|---|
| DE | 102010014078 A1 | 1/2012 |
| JP | 4847983 B2 | 12/2011 |
| JP | 5370821 B2 | 12/2013 |

* cited by examiner

*Primary Examiner* — Dennis H Pedder
(74) *Attorney, Agent, or Firm* — Frank A. MacKenzie; Bejin Bieneman PLC (57) ABSTRACT

A hood latch support assembly includes a support beam having a first portion, a second portion, and a latch support portion disposed between the first portion and the second portion. The first portion has a strength, and the second portion has a strength that is less than the strength of the first portion.

20 Claims, 7 Drawing Sheets

HOOD LATCH SUPPORT BEAM

BACKGROUND

A vehicle typically includes a hood releasably secured to a cross beam at a front of the vehicle. The cross beam may fracture, such as during a high severity collision involving an impact to the front of the vehicle. Such fracture may cause the hood to release from its securement to the cross beam, thereby permitting the hood to open.

DETAILED DESCRIPTION

A hood latch support assembly includes a support beam having a first portion, a second portion, and a latch support portion disposed between the first portion and the second portion. The first portion has a strength. The second portion has a strength that is less than the strength of the first portion.

The latch support portion may have a strength that is greater than the strength of the second portion.

The first portion may have a thickness, and the second portion may have a thickness that is less that the thickness of the first portion.

The first portion may have a width and the second portion may have a width that is less that the width of the first portion.

The second portion may define a hole spaced from the latch support portion by a distance, and the first portion may be free of holes spaced from the latch support portion by the distance.

The second portion may include a wrinkle spaced from the latch support portion by a distance, and the first portion may be free of wrinkles spaced from the latch support portion by the distance.

The support beam may include a first wall, a second wall extending perpendicularly from the first wall, and a third wall extending perpendicularly from the first wall and spaced from the second wall.

The latch support portion may include a first rib extending between the second wall and the third wall, and a second rib extending between the second wall and the first rib.

The hood latch support assembly may include a latch secured to the latch support portion.

The first portion may include a first material having a strength, and the second portion may include a second material having a strength than is less than the strength of the first material.

A vehicle includes a hood including a striker. The vehicle includes a support beam having a first portion, a second portion, and a latch support portion between the first portion and the second portion. The vehicle includes a latch secured to the latch support portion and releasably engaged with the striker. The first portion has a strength. The second portion has a strength that is less than the strength of the first portion.

The second portion may be designed to transition from a solid state to a fractured state upon application of a threshold amount of force to the support beam, the threshold amount of force may be based on a standard crash test, and the second portion may be fractured in the fractured state.

The support beam may have a passenger side and a driver side, the second portion may be located at the passenger side.

The support beam may include a front wall elongated along the first portion, the second portion, and the latch support portion, and a top wall extending perpendicularly from the front wall and elongated along the first portion, the second portion, and the latch support portion.

The front wall may define a hole at the second portion spaced from the latch support portion by a distance, and the front wall may be free of holes at the first portion spaced from the latch support portion by the distance.

The support beam may include a bottom wall spaced from the top wall and extending perpendicularly from the front wall and elongated along the first portion, the second portion, and the latch support portion.

The top wall and the bottom wall may each include a wrinkle at the second portion spaced from the latch support portion by a distance, and the top wall and the bottom wall may each be planar at the first portion spaced from the latch support portion by the distance.

The latch support portion may include a first rib extending from the top wall to the bottom wall and a second rib extending from the top wall to the first rib.

The latch support portion may include a third rib extending from the bottom wall to the first rib.

The first rib may be arcuate.

With reference to the Figures, a hood latch support assembly 20 for a vehicle 22 includes a support beam 24 having a first portion 26, a second portion 28, and a latch support portion 30 disposed between the first portion 26 and the second portion 28. The first portion 26 has a strength. The second portion 28 has a strength that is less than the strength of the first portion.

The hood latch support beam 24 provides a redundant system to keep a hood 32 releasably engaged with the hood latch support assembly 20. Specifically, the lower strength of the second portion 28 enables the second portion 28 to fracture while the first portion 26 remains intact, e.g., upon impact of the vehicle 22 with an object, e.g., another vehicle. Fracturing at the second portion 28 allows the hood 32 of the vehicle 22 to maintain engagement with the support beam 24, e.g., with a latch 34 secured to the support beam 24, after impact of the vehicle 22. To put it another way, the lower strength of the second portion 28 helps to prevent the hood 32 from opening and blocking a field of view of a driver of the vehicle 22 after the impact of the vehicle 22 with another object.

Figure 1:
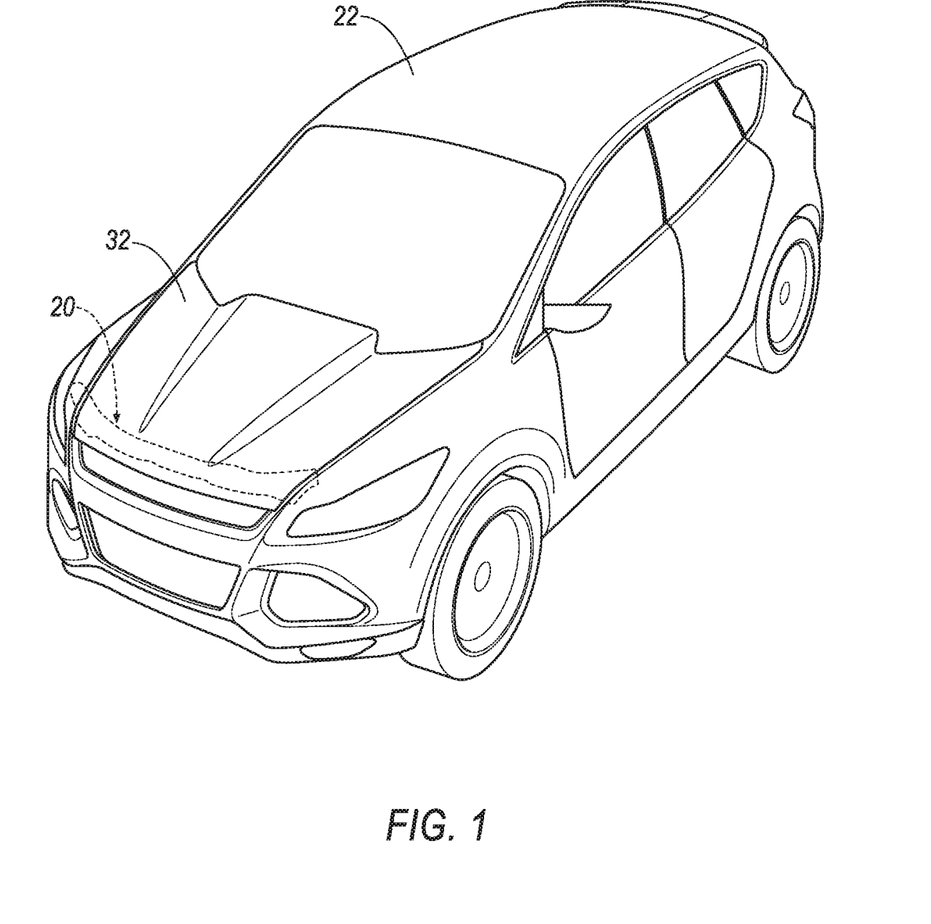
FIG. 1 is a perspective view of a vehicle including a hood latch support assembly.
Figure 2:
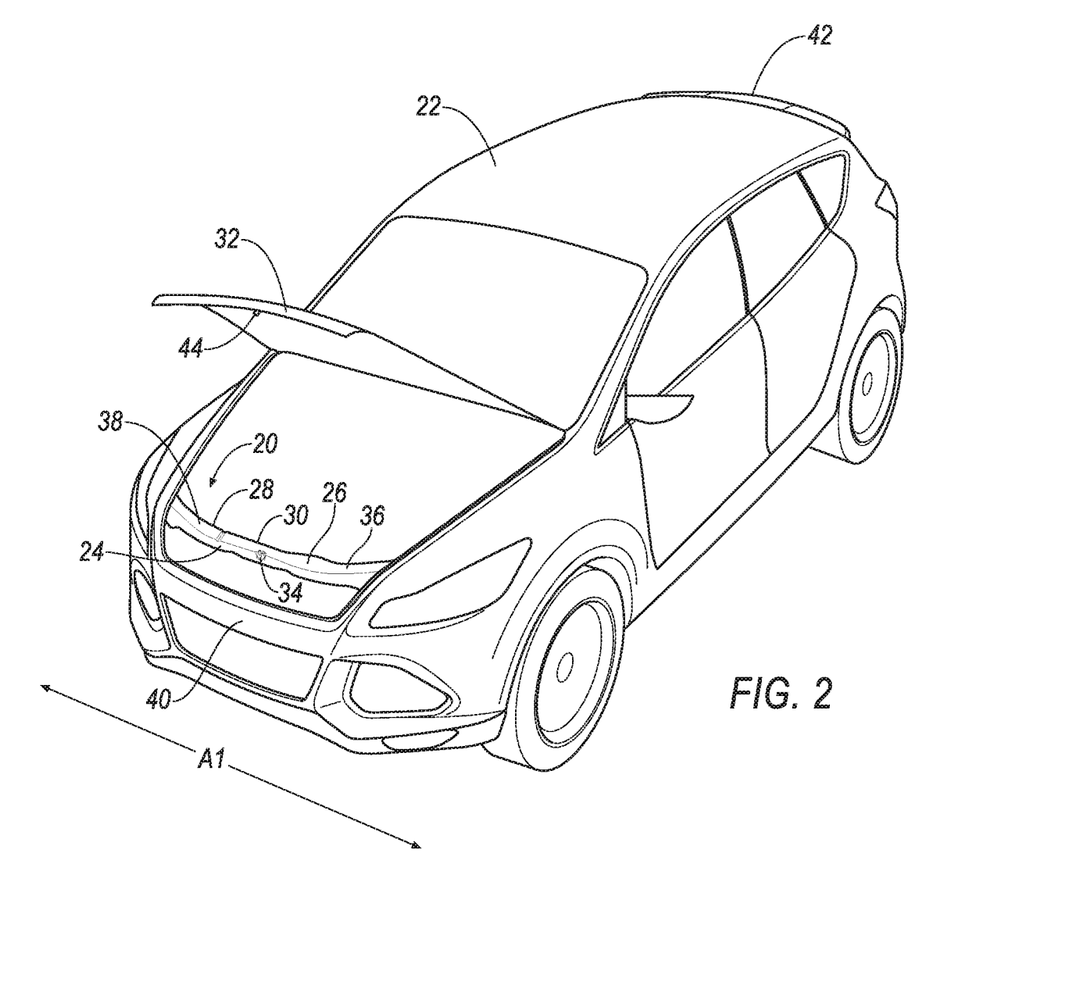
FIG. 2 is a perspective view of the vehicle of FIG. 1 with a hood in an open position.
Figure 3:
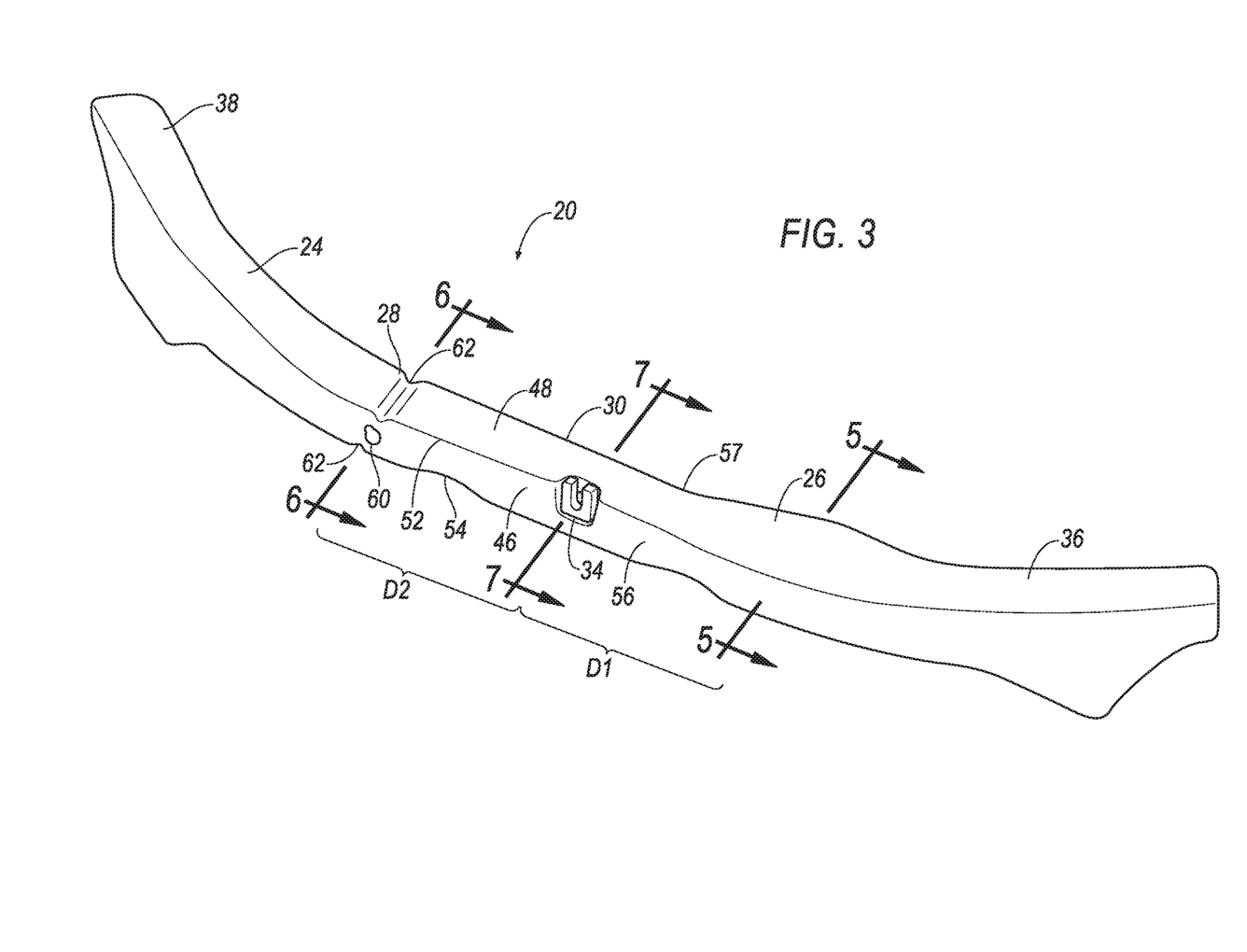
FIG. 3 is a perspective view of the hood latch support assembly of FIG. 1.

The vehicle 22, shown in FIGS. 1 and 2, may be any passenger or commercial automobile such as a car, a truck, a sport utility vehicle, a crossover vehicle, a van, a minivan, a taxi, a bus, etc. The vehicle 22 may include a passenger cabin. The vehicle 22 may include a driver side 36 and a passenger side 38. For example, controls for navigating the vehicle 22, such as a steering wheel, pedal assemblies, etc., may be located on the driver side 36 and within the passenger cabin. The passenger side 38 may be opposite the driver side 36. The vehicle 22 defines a front 40 and a rear 42, e.g., relative to a normal forward traveling direction of the vehicle 22, relative to an orientation of the controls for navigating the vehicle 22, etc. The vehicle 22 has a cross-vehicle axis A1, e.g., extending between the driver side 36 and the passenger side 38.

The vehicle 22 may include a body and a frame. The body and frame may be of a unibody construction. In the unibody construction, the body, e.g., rockers, serves as the vehicle frame, and the body (including the rockers, pillars, roof rails, etc.) is unitary, i.e., a continuous one-piece unit. As another example, the body and frame may have a body-on-frame construction (also referred to as a cab-on-frame construction). In other words, the body and frame are separate components, i.e., are modular, and the body is supported on and affixed to the frame. Alternatively, the body and frame may have any suitable construction. The body and/or the frame may be formed of any suitable material, for example, steel, aluminum, etc.

The vehicle 22 includes a hood 32. The hood 32 may cover and protect an engine bay of the vehicle 22. The hood 32 moves between a closed position, as shown in FIG. 1, and an open position, as shown in FIG. 2. In the closed position the hood 32 prohibits access to the engine bay. In the open position the hood 32 permits access to the engine bay. In the open position is the hood 32 may block a field of view of the driver of the vehicle 22. The hood 32 may be made of metal, carbon fiber, fiber glass, or any other suitable material.

The hood 32 may include a striker 44. The striker 44 is designed to engage with the latch 34, e.g., to maintain the hood 32 in the closed position. The striker 44 may be D-shaped and extend from a bottom surface of the hood 32. The striker 44 may be made of metal, or any other suitable material.

The latch 34 may be secured to the latch support portion 30 of the support beam 24, e.g., with one or more fasteners, via welding, with one or more clips, etc. The latch 34 releasably engages with the striker 44, e.g. to maintain the hood 32 in the closed position and to permit the hood 32 to move to the open position. For example, the latch 34 may move between an open position and a closed position. As one example, the latch 34 is rotatable relative to the support beam 24 between the open position and the closed position. In the open position, the latch 34 releases engagement with the striker 44 to allow the hood 32 to move the open position. In the closed position, the striker 44 engages the latch 34 when the hood 32 is in the closed to position to retain the hood 32 in the closed position.

The support beam 24, includes the first portion 26, the second portion 28, and the latch support portion 30 located therebetween. The support beam 24 may be monolithic, i.e., first portion 26, the second portion 28, and the latch support portion 30 are single, uniform piece of material with no seams, joints, fasteners, welds, or adhesives holding them together.

The support beam 24 may be located at the front 40 of the vehicle 22. The support beam 24 may be a component of the frame and/or body of the vehicle 22. The support beam 24 may be elongated along the cross-vehicle axis A1, having the passenger side 38 and the driver side 36. The support beam 24 may support the hood 32, e.g., in the closed position. The support beam 24 may be made of metal, steel, magnesium, aluminum, fiber glass, etc., including a combination thereof.

The support beam 24 may include a front wall 46, a top wall 48, and a bottom wall 50, e.g., relative to the vehicle 22. The walls 46, 48, 50 may be referred to as first, second and third walls, respectively.

The front wall 46 may be elongated along the first portion 26, the second portion 28, and the latch support portion 30. To put it another way, the front wall 46 may be elongated along the cross-vehicle axis A1 along a length of the support beam 24. The front wall 46 may include a front surface 56 and a rear surface 58. The front wall 46 may include a top edge 52 and a bottom edge 54.

The top wall 48 may extend perpendicularly from the front wall 46, e.g., from the top edge 52 of the front wall 46. The top wall 48 may extend to a distal edge 57. The top wall 48 may include a top surface 61 and a bottom surface 63. The top wall 48 may be elongated along the first portion 26, the second portion 28, and the latch support portion 30. To put it another way the top wall 48 may be elongated along the cross-vehicle axis A1 along the length of the support beam 24.

The bottom wall 50 may be spaced from the top wall 48 and extend perpendicularly from the front wall 46, e.g., from the bottom edge 54 of the front wall 46. The bottom wall 50 may extend to a distal edge 59. The bottom wall 50 may include a top surface 65 and a bottom surface 67. The bottom wall 50 may be elongated along the first portion 26, the second portion 28, and the latch support portion 30. To put it another way the bottom wall 50 may be elongated along the cross-vehicle axis A1 along the length of the support beam 24.

The top wall 48 and the bottom wall 50 may extend rearwardly from the front wall 46, providing a C-shaped cross-section to the support beam 24.

The first portion 26 may be located on the passenger side 38 of the support beam 24.

The strength of the first portion 26 is greater than the strength of the second portion 28, e.g., such that application of force F to the support beam 24, such as during an impact of the vehicle 22, causes the second portion 28, and the not first portion 26, to fracture. The strength of the first portion 26 depends on, for example, dimensions (e.g., width and thickness as described below), material type, geometric shape and/or cross-sectional shape (e.g., wrinkles and holes, or lack thereof, as described below), etc., of the first portion 26.

Figure 4:
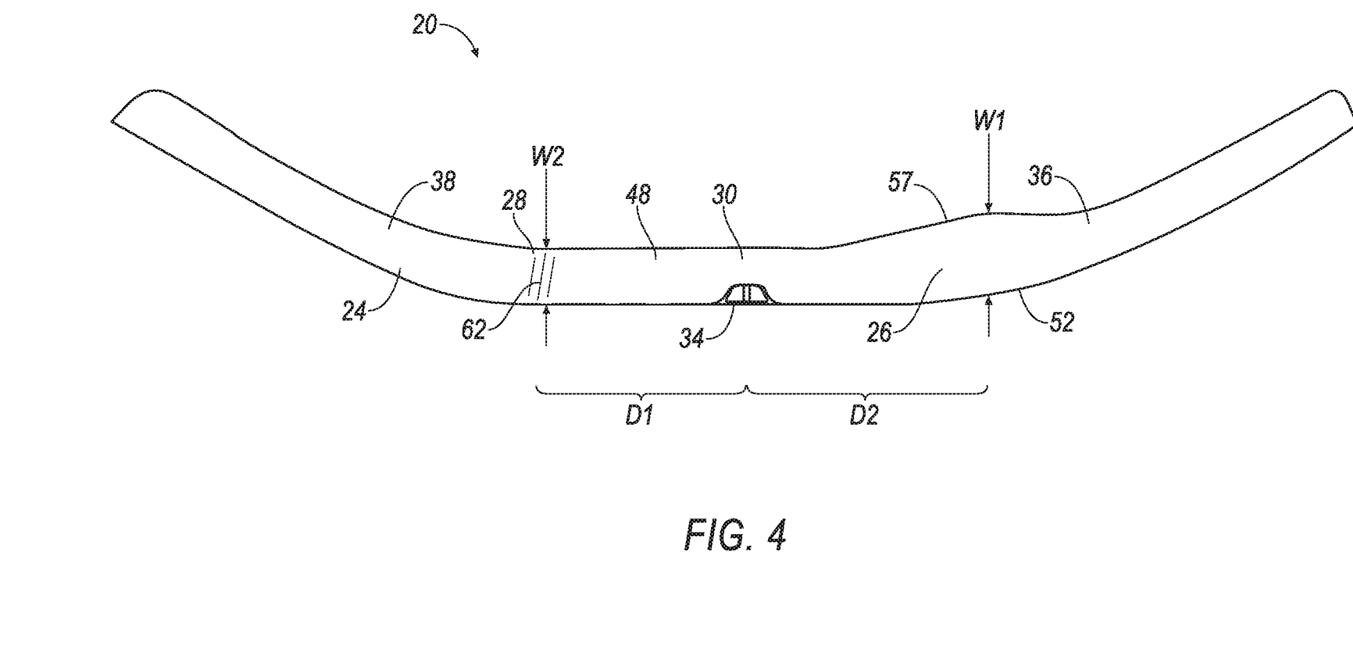
FIG. 4 is a top view of the hood latch support assembly of FIG. 1.
Figure 5:
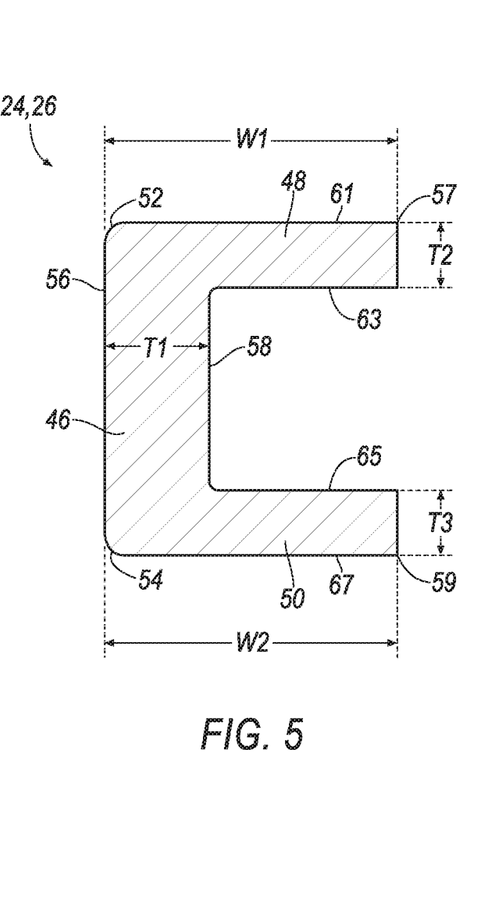
FIG. 5 is a cross-section view of a first portion of the hood latch support assembly of FIG. 3.

As set forth above, the first portion 26 has a width. The greater the width of the first portion 26, the greater the strength of the first portion 26. As one example, the width of the first portion 26 may be a width W1 of the top wall 48 at the first portion 26, e.g., between the top edge 52 and the distal edge 57, as shown in FIG. 5. As another example, the width of the first portion 26 may be a width W2 of the bottom wall 50 at the first portion 26, e.g., between the bottom edge 54 and the distal edge 59. The width of the first portion 26 may be at a distance D1 from the latch support portion 30, e.g., a distance from where the first portion 26 meets the latch support portion 30, a distance from a center of the latch support portion 30 (shown in FIG. 4), etc.

The first portion 26 has a thickness. The greater the thickness of the first portion 26, the greater the strength of the first portion 26. As one example, the thickness of the first portion 26 may be a thickness T1 of the front wall 46 at the first portion 26, e.g., between the front surface 56 and the rear surface 58 of the front wall 46, as shown in FIG. 5. As another example, the thickness of the first portion 26 may be a thickness T2 of the top wall 48 at the first portion 26, e.g., between the top surface 61 and the bottom surface 63. As another example, the thickness of the first portion 26 may be a thickness T3 of the bottom wall 50 at the first portion 26, e.g., between the top surface 65 and the bottom surface 67. The thickness of the first portion 26 may be at the distance D1 from the latch support portion 30.

The first portion 26 may free of holes spaced from the latch support portion 30 by the distance D1. For example, the first portion 26 may be completely solid at the distance D1 from the latch support portion 30, e.g., without any openings that may provide stress concentration areas or otherwise weaken the first portion 26 such that the first portion 26 would fracture prior to, or concurrently with, fracturing of the second portion 28. For example, the front wall 46 may be free of holes at the first portion 26 spaced from the latch support portion 30 by the distance D1.

The first portion 26 may free of wrinkles spaced from the latch support portion 30 by the distance D1. For example, the top wall 48 and the bottom wall 50 may each be planar at the first portion 26 spaced from the latch support portion 30 by the distance D1.

The first portion 26 may be made of one or more materials, e.g., metal, steel, magnesium, aluminum, fiber glass, etc., including a combination thereof, that provide the strength to the first portion 26. The materials may cause the strength of the first portion to be greater than the strength of the second portion with or without the features described herein, e.g., with or without the thickness of the first portion 26, the width of the first portion 26, being free of holes, being free of wrinkles, etc.

Figure 9:
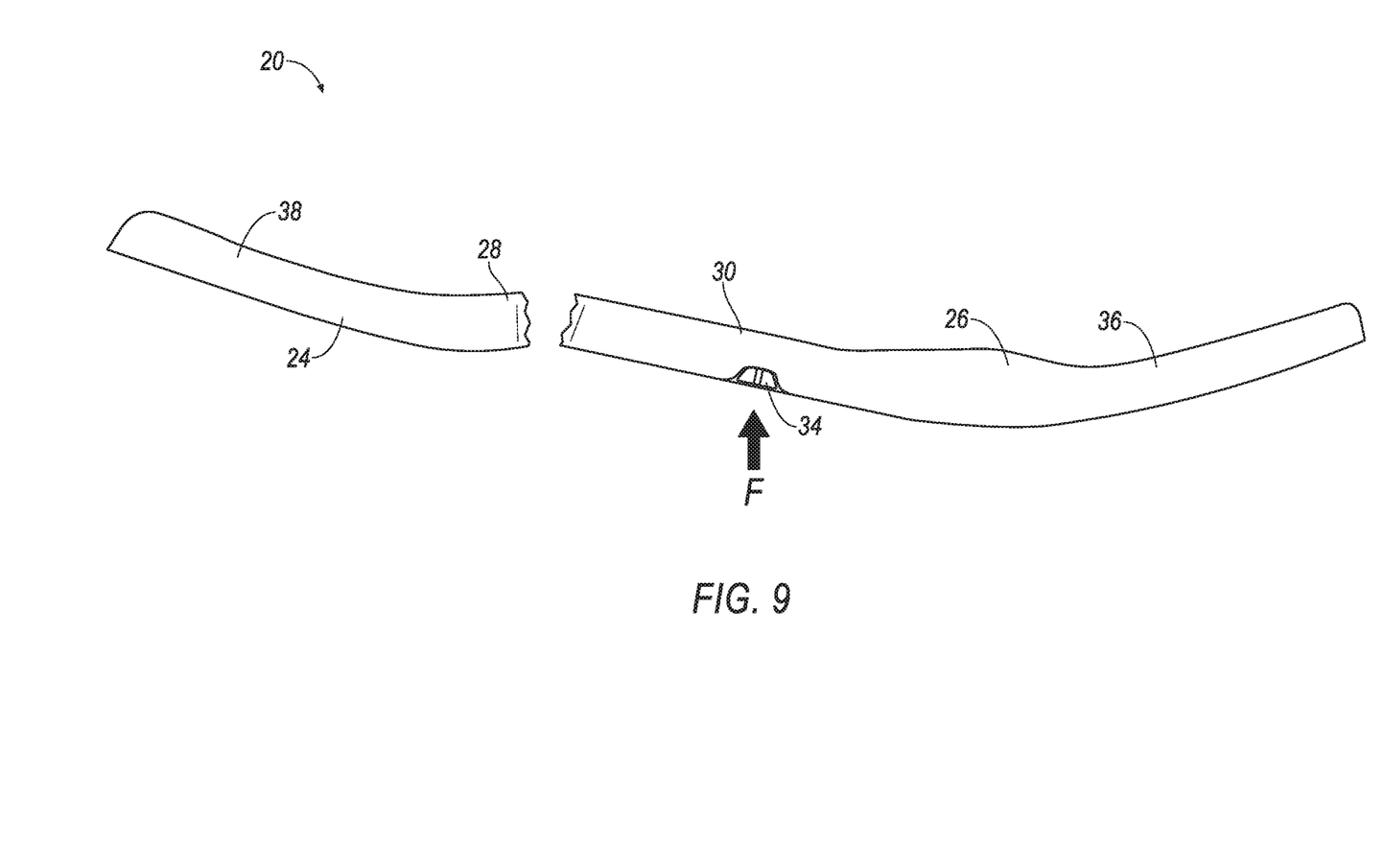
FIG. 9 is a top view of the hood latch support assembly of FIG. 1 in a fractured state.

The second portion 28 is designed to transition from a solid state, as shown in FIGS. 1-4 and 8 to a fractured state, as shown in FIG. 9. The second portion 28 is fractured in the fractured state. The second portion 28 transitions to the fractured state upon application of a threshold amount of force F to the support beam 24. The threshold amount of force F may be based on a standard crash test. For example, the vehicle 22 may be subject to an Insurance Institute for Highway Safety (IIHS) Moderate Overlap Test. An impact to the vehicle 22 from such test transitions the second portion 28 from the solid state to the fractured state, e.g., while the first portion 26 and the latch support portion 30 remain unfractured.

The second portion 28 may be located at the passenger side 38. Locating the second portion 28 at the passenger side 38 helps to ensure that any movement of the hood 32 resulting from the second portion 28 being in the fractured state is away from the driver side 36. To put it another way, locating the second portion 28 at the passenger side 38 helps to maintain the field of view of the driver of the vehicle 22 when the second portion 28 is in the fractured state.

The lower strength of second portion 28 relative to the strength of the first portion encourages transition of the second portion 28 to the fractured state upon application of a force exceeding the threshold amount.

The second portion 28 has a width. The lower the width of the second portion 28, the lower the strength of the second portion 28. The width of the second portion 28 may be less that the width of the first portion 26. As one example, the width of the second portion 28 may be a width W3 of the top wall 48 at the second portion 28, e.g., between the top edge 52 and the distal edge 57, shown in FIG. 6. As another example, the width of the second portion 28 may be a width W4 of the bottom wall 50 at the second portion 28, e.g., between the bottom edge 54 and the distal edge 59. The width of the second portion 28 may be at a distance from the latch support portion 30, e.g., a distance from where the second portion 28 meets the latch support portion 30, a distance D2 from a center of the latch support portion 30 (shown in FIG. 4), etc. The distance D2 may be the same as the distance D1, e.g., with the distance D2 extending from the latch support portion 30 in one direction and the distance D1 extending from the latch support portion 30 in an opposite direction.

Figure 6:
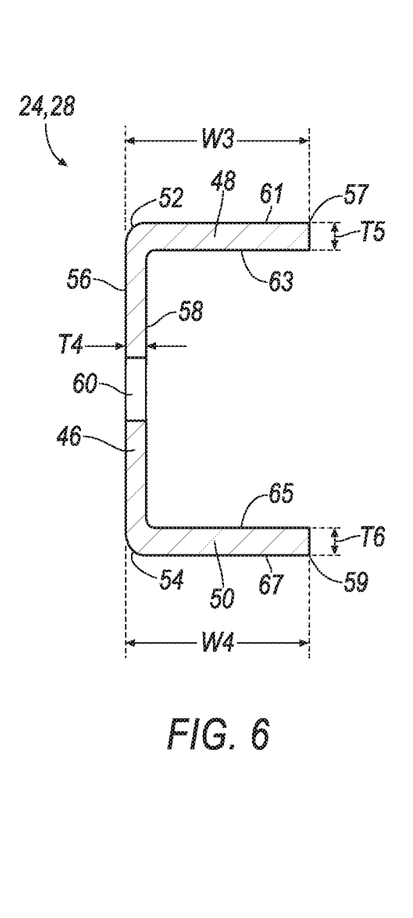
FIG. 6 is a cross-section view of a second portion of the hood latch support assembly of FIG. 3.

The second portion 28 has a thickness. The lower the thickness of the second portion 28, the lower the strength of the second portion 28. The thickness of the second portion 28 may be less that the thickness of the first portion 26. As one example, the thickness of the second portion 28 may be a thickness T4 of the front wall 46 at the second portion 28, e.g., between the front surface 56 and the rear surface 58 of the front wall 46, as shown in FIG. 6. As another example, the thickness of the second portion 28 may be a thickness T5 of the top wall 48 at the second portion 28, e.g., between the top surface 61 and the bottom surface 63. As another example, the thickness of the second portion 28 may be a thickness T6 of the bottom wall 50 at the second portion 28, e.g., between the top surface 65 and the bottom surface 67. The thickness of the second portion 28 may be at the distance D2 from latch support portion 30.

The second portion 28 may define a hole 60 spaced from the latch support portion 30 by the distance D2. The hole 60 reduces the strength of the second portion 28, e.g., by having less material to carry the stress generated by the force F applied to the support beam 24, by creating stress concentration areas in second portion 28 at the hole 60, etc. The hole 60 may be round, oval, or any other shape. For example, the front wall 46 may define the hole 60 at the second portion 28 spaced from the latch support portion 30 by the distance D2.

The second portion 28 may include one or more wrinkles 62 spaced from the latch support portion 30 by the distance D2. The wrinkles 62 reduce the strength of the second portion 28, e.g., by providing a stress concentration area at each wrinkle 62, by altering a microstructure of the second portion 28 at each wrinkle 62, by altering a uniform geometry of the second portion 28 at each wrinkle 62, etc. For example, the top wall 48 and the bottom wall 50 each include one of the one or more wrinkles 62 at the second portion 28 spaced from the latch support portion 30 by the distance D2. The wrinkles 62 may be on opposite sides of the hole 60. To put it another way, the hole 60 may be between the wrinkle 62 in the top wall 48 and the wrinkle 62 in the bottom wall 50.

The second portion 28 may be made of one or more materials, e.g., metal, steel, magnesium, aluminum, fiber glass, etc., including a combination thereof., that provide the second strength to the second portion 28. The materials may provide the second strength with or without the features described herein, e.g., with or without the thickness of the second portion 28, the width of the second portion 28, the hole 60, the wrinkles 62, etc. For example, the first portion 26 may be a first type of material, such as steel, and the second portion 28 may be a second type of material, such as aluminum, that has a lower strength than the first type of material.

The latch support portion 30 supports the latch 34. For example, the latch support portion 30 may be secured to the latch 34, as described above. The latch support portion 30 is disposed between the first portion 26 and the second portion 28. For example, the first portion 26 may extend away from the latch support portion 30 along the cross-vehicle axis A1 on one side of the latch support portion 30, and the second portion 28 may extend way from the latch support portion 30 along the cross-vehicle axis A1 on an opposite side of the latch support portion 30.

The latch support portion 30 is designed to maintain engagement between the latch 34 and the striker 44 when the second portion 28 is in the fractured state, e.g., to maintain the hood 32 in the closed position after the impact to the vehicle 22. To maintain such engagement, the latch support portion 30 may have a strength that is greater than the strength of the second portion.

Figure 7:
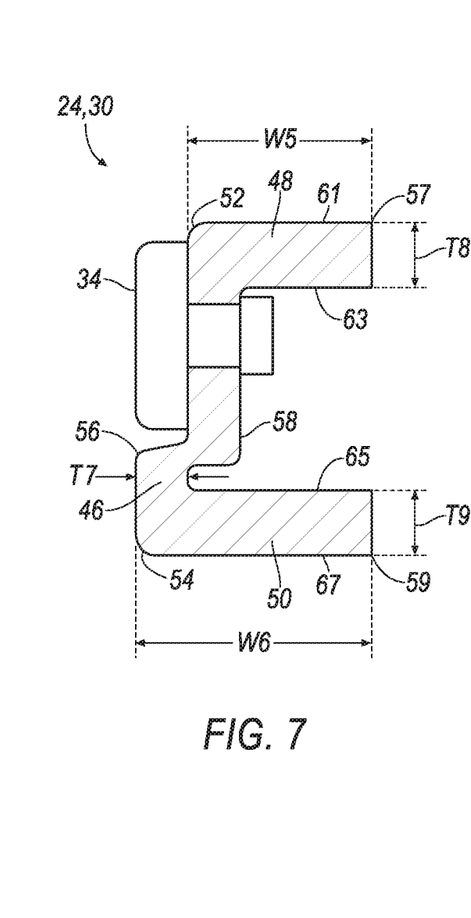
FIG. 7 is a cross-section view of a latch support portion of the hood latch support assembly of FIG. 3.
Figure 8:
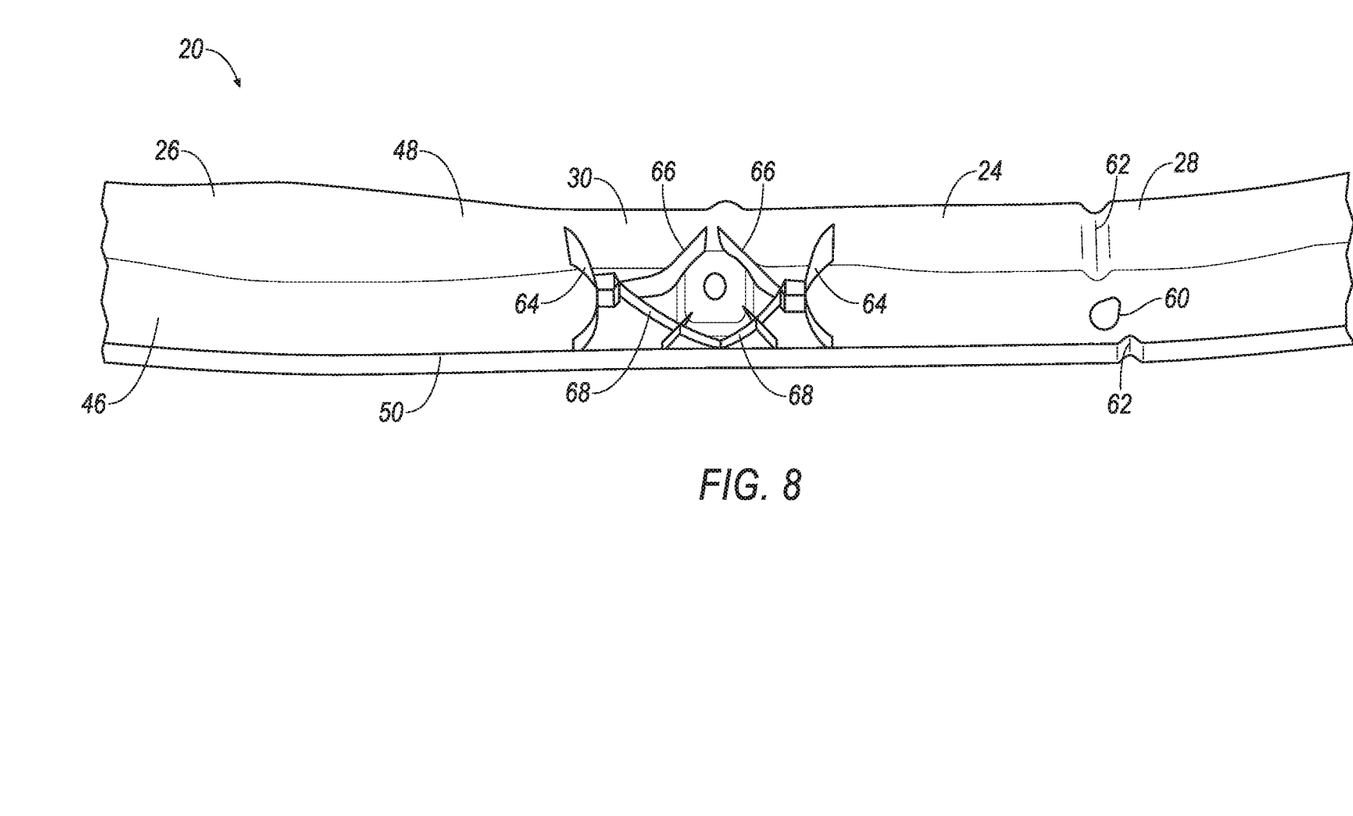
FIG. 8 is a perspective view of the hood latch support assembly of FIG. 1.

The latch support portion 30 has a width. For example, the width of the latch support portion 30 may be of a width W5 of the top wall 48 at the latch support portion 30, as shown in FIG. 7. As another example, the width of the latch support portion 30 may be a width W6 of the bottom wall 50 at the latch support portion 30. For example, as described for the width of the first portion 26. The width of the latch support portion 30 may be greater than the width of the second portion 28.

The latch support portion 30 has a thickness. For example, the thickness of the latch support portion 30 may be a thickness T7 of the front wall 46 at the latch support portion 30. As another example, the thickness of the latch support portion 30 may be a thickness T8 of the top wall 48 at the latch support portion 30. As another example, the thickness of the latch support portion 30 may be a thickness T9 of the bottom wall 50. For example, as described for the thickness of the first portion 26. The thickness of the latch support portion 30 may be greater than the thickness of the second portion 28.

The latch support portion 30 may include a first rib 64. The first rib 64 may extend between the top wall 48 and the bottom wall 50. The first rib 64 may be arcuate. The arcuate shape of the first rib 64 may include an apex that is toward the latch 34. The first rib 64 may be a same type of material as the top wall 48, bottom wall 50, and/or front wall 46. The first rib 64 may be a different type of material than the top wall 48, bottom wall 50, and/or front wall 46.

For example, the latch support portion 30 may include a second rib 66 and/or a third rib 68. The second rib 66 may extend between the top wall 48 and the first rib 64. The third rib 68 may extend from the bottom wall 50 to the first rib 64. The first rib 64 and/or the second rib 66 may be a same type of material as the top wall 48, bottom wall 50, and/or front wall 46. The first rib 64 and/or the second rib 66 may be a different type of material as the top wall 48, bottom wall 50, and/or front wall 46.

The ribs 64, 66, 68 provide additional strength to the latch support portion 30, e.g., by increasing the rigidity of the latch support portion 30 and by transferring stress between the top wall 48, the bottom wall 50, and/or the front wall 46, e.g., to reduce stress concentration areas.

Under normal operation of the vehicle 22 the hood 32 is in the closed position, with the striker 44 engaged with the latch 34. In the event of an impact, e.g., a front impact to the vehicle 22, force F is applied to the support beam 24. The application of such force F creates stress in the support beam 24, and causes the second portion 28 to transition from the solid state to the fractured state, e.g., the second portion 28 fractures at the wrinkles 62 and/or hole 60. Such fracturing helps to relieving the stress in the support beam 24. After the second portion 28 is in the fractured state, the striker 44 remains engaged with the latch 34, thereby maintaining the hood 32 in the closed position.

The adjectives "first," "second," and so on, are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A hood latch support assembly comprising:
   a support beam having a first portion, a second portion, and a latch support portion disposed between the first portion and the second portion;
   the first portion having a strength; and
   the second portion having a strength that is less than the strength of the first portion;
   wherein the support beam is asymmetrical about the latch support portion, the second portion includes a wrinkle spaced from the latch support portion by a first distance in a first direction from the latch support portion, and the first portion is free of wrinkles along a second distance at least as long as the first distance in a second direction from the latch support portion.

2. The hood latch support assembly of claim 1, wherein the latch support portion has a strength that is greater than the strength of the second portion.

3. The hood latch support assembly of claim 1, wherein the first portion has a thickness, and the second portion has a thickness that is less that the thickness of the first portion.

4. The hood latch support assembly of claim 1, wherein the first portion has a width and the second portion has a width that is less that the width of the first portion.

5. The hood latch support assembly of claim 1, wherein the second portion defines a hole spaced from the latch support portion by the first distance, and the first portion is free of holes spaced from the latch support portion by the second distance.

6. The hood latch support assembly of claim 1, wherein the support beam includes a first wall, a second wall extending perpendicularly from the first wall, and a third wall extending perpendicularly from the first wall and spaced from the second wall.

7. The hood latch support assembly of claim 6, wherein the latch support portion includes a first rib extending between the second wall and the third wall, and a second rib extending between the second wall and the first rib.

8. The hood latch support assembly of claim 1, further comprising a latch secured to the latch support portion, and wherein the support beam is asymmetrical about the latch, the wrinkle of the second portion spaced from the latch by the first distance and the first portion free of wrinkles spaced from the latch by the second distance.

9. The hood latch support assembly of claim 1, wherein the first portion includes a first material having a strength, and the second portion includes a second material having a strength than is less than the strength of the first material.

10. A vehicle comprising:
    a hood including a striker; and
    a support beam and having a first portion, a second portion, and a latch support portion between the first portion and the second portion;
    a latch secured to the latch support portion and releasably engaged with the striker;
    the first portion having a strength; and
    the second portion having a strength that is less than the strength of the first portion;
    wherein the support beam is transitionable from a first state to a second state, the first portion and the second portion unfractured in the first state, the first portion unfractured and the second portion fractured in the second state.

11. The vehicle of claim 10, wherein the second portion support beam is designed to transition from the first state to the second state upon application of a threshold amount of force to the support beam, the threshold amount of force based on a standard crash test.

12. The vehicle of claim 10, wherein the support beam is asymmetrical about the latch and has a passenger side and a driver side, the second portion located at the passenger side.

13. The vehicle of claim 10, wherein the support beam includes a front wall elongated along the first portion, the second portion, and the latch support portion, and a top wall extending perpendicularly from the front wall and elongated along the first portion, the second portion, and the latch support portion.

14. The vehicle of claim 13, wherein the front wall defines a hole at the second portion spaced from the latch support portion by a distance, the front wall is free of holes at the first portion spaced from the latch support portion by the distance, and the second portion is fractured at the hole in the second state.

15. The vehicle of claim 13, wherein the support beam includes a bottom wall spaced from the top wall and extending perpendicularly from the front wall and elongated along the first portion, the second portion, and the latch support portion.

16. The vehicle of claim 15, wherein the top wall and the bottom wall each include a wrinkle at the second portion spaced from the latch support portion by a distance, the top wall and the bottom wall are each planar at the first portion spaced from the latch support portion by the distance, and the second portion is fractured at the wrinkle of the top wall and the wrinkle of the bottom wall in the second state.

17. The vehicle of claim 15, wherein the latch support portion includes a first rib extending from the top wall to the bottom wall and a second rib extending from the top wall to the first rib.

18. The vehicle of claim 17, wherein the latch support portion includes a third rib extending from the bottom wall to the first rib.

19. The vehicle of claim 18, wherein the first rib is arcuate.

20. The hood latch support assembly of claim 5, wherein the second portion includes a second wrinkle spaced from the latch support portion by the first distance, the wrinkle and the second wriggle elongated parallel to each other, the hole between the wrinkle and the second wriggle.

* * * * *

UNITED STATES PATENT AND TRADEMARK OFFICE
CERTIFICATE OF CORRECTION

PATENT NO.        : 10,807,650 B2
APPLICATION NO.   : 15/730130
DATED             : October 20, 2020
INVENTOR(S)       : Jungmao Michael Chang et al.

Page 1 of 1

It is certified that error appears in the above-identified patent and that said Letters Patent is hereby corrected as shown below:

In the Claims

Column 8, in Line 28, replace "a thickness that is less that the thickness of the first portion" with
— a thickness that is less than the thickness of the first portion —

Column 8, in Line 31, replace "width that is less that the width of the first portion." with
— width that is less than the width of the first portion. —

Column 8, in Line 55, replace "strength than is less than the strength of the first material" with
— strength that is less than the strength of the first material —

Column 10, in Line 23, replace "and the second wriggle elongated parallel to each other, the" with
— and the second wrinkle elongated parallel to each other, the —

Column 10, in Line 24, replace "hole between the wrinkle and the second wriggle" with
— hole between the wrinkle and the second wrinkle —

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*